United States Patent [19]

Schmitt

[11] Patent Number: 5,103,942
[45] Date of Patent: Apr. 14, 1992

[54] BRAKE FOR VEHICLE WHEELS

[75] Inventor: Otto Schmitt, Leverkusen, Fed. Rep. of Germany

[73] Assignee: Textar GmbH, Fed. Rep. of Germany

[21] Appl. No.: 272,351

[22] Filed: Nov. 17, 1988

[30] Foreign Application Priority Data

Nov. 17, 1987 [DE] Fed. Rep. of Germany ....... 3738949

[51] Int. Cl.5 .............................................. F16D 69/02
[52] U.S. Cl. .............................. 188/251 R; 188/251 A; 188/251 M; 192/107 M
[58] Field of Search .......... 188/251 A, 251 M, 251 R, 188/264 G; 192/107 M; 92/170.1

[56] References Cited

U.S. PATENT DOCUMENTS

| 3,092,214 | 6/1963 | Batchelor et al. | 189/251 M X |
| 3,477,551 | 11/1969 | Beuchle et al. | 188/251 A X |
| 3,684,062 | 8/1972 | Johnson | 188/251 R |
| 4,290,510 | 9/1981 | Warren | 188/218 XL |
| 4,618,049 | 10/1986 | Pflaum et al. | 192/107 M |

FOREIGN PATENT DOCUMENTS

| 1655344 | 8/1971 | Fed. Rep. of Germany | 188/251 M |
| 62735 | 4/1984 | Japan | 188/251 R |
| 149626 | 7/1986 | Japan | 188/264 G |
| 823675 | 11/1959 | United Kingdom | 188/251 R |
| 2112454 | 7/1983 | United Kingdom | 92/170.1 |

Primary Examiner—George E. A. Halvosa
Attorney, Agent, or Firm—Diller, Ramik & Wight

[57] ABSTRACT

A brake for vehicle wheels which includes a generally stationary brake part and a rotatable brake part adapted for cooperative braking interaction, the generally stationary brake part and rotatable brake part each respectively carrying a layer of friction material, the generally stationary and rotatable brake parts being positioned with the friction material layers in opposing relationship to each other, a hydraulic cylinder and position for forcefully moving the generally stationary brake part toward the rotatable brake part to effect braking therebetween through frictional contact of the friction material layers, the rotatable brake part layer being plastic-bonded organic friction material, and the generally stationary brake part layer being ceramic material.

7 Claims, 3 Drawing Sheets

BRAKE FOR VEHICLE WHEELS

BACKGROUND OF THE INVENTION

This invention relates to brakes for vehicle wheels, such as road, rail and aircraft vehicles, such as a partially lined disk brake conventionally including a rotating brake part (brake disk) and a stationary brake part (brake shoe) which are brought into cooperative braking interaction by a hydraulically operated piston.

In virtually any specific vehicle field, but particularly in the automotive vehicle field, brakes must have high reliability, power and service life coupled with relatively small size to accommodate reduced mounting spaces of today's road vehicles. Such brakes must meet or exceed strict vehicle weight limitations, particularly those set for automotive vehicles and railroad vehicles. Such factors, together with the need of using ecologically harmless materials (asbestos-free friction material) are at the point of reaching economically justifiable limits.

Above all, the high price of asbestos substitutes and the working stresses of the friction linings when considered in connection with the admitted high driving speed of motor vehicles of the present generation requires excellent brakes and particularly brake linings which will fit properly, will wear evenly, will stop vehicles quickly, and can achieve low initial cost as well as low cost for subsequent maintenance and/or repair.

Problems such as those outlined earlier are now very difficult to master through redesigning conventional brake systems or modifying the brake linings thereof. However, it is necessary to maintain low weight of the brakes without increasing the constructional dimensions or reducing the friction load surface or the thermal stress of the brake lining friction material. In simple terms, if the brake lining friction material can achieve excellent braking with corresponding reduced wear, considerable savings of cost will result from the standpoint of maintenance and repair.

DESCRIPTION OF RELATED ART

Heretofore attempts have been made to improve brake systems by utilizing ceramics, such as is disclosed in DE-OS 35 15 512 in which a brake disk has a friction ring made exclusively from ceramic material. Other prior publications disclose such brake disks in which the conventional steel brake disk is coated with ceramic material or the disk is made of a ceramic metal alloy (Cermet). Common to these braking systems is that the customary friction linings of organic friction material are used in the same sizes, shapes and arrangements as are used in conventional brakes, namely, partial lining brakes provided with a steel disk. However, the problem of high specific friction surface load is not solved by brakes which have ceramic disks. At best ceramic brake disks reduce wear and tend to dissipate heat better than conventional brakes.

In the case of a brake disk for aircraft brakes, according to DE-OS 24 18 024, annular interchangeable frictional linings of carbon material are fixed to the core of the brake disks. If such friction linings are in frictional interaction with stationary sintered metal elements, the specific friction surface load of the friction material is considerably reduced. However, except for the high costs in such brake systems, the combination of plastic/sintered metal is not applicable for reasons of specific friction behavior, comfort and a load profile which, though applicable to aircraft vehicles, is inapplicable to road vehicles.

SUMMARY OF THE INVENTION

An object of the present invention is to provide a novel brake which is reliable under all operational conditions in association with heavy and/or high speed vehicles, be they road vehicles, rail vehicles or aircraft. The brake of the present invention is relatively small and light and provides a low specific friction surface load. Essentially, the invention is characterized in that the rotatable brake part of the brake carries as a friction layer a coating or layer of plastic-bonded organic friction material while the generally stationary brake part of the brake carries as the friction layer ceramic friction material. Due to the latter arrangement, the generally stationary brake part (brake shoe) which is under the highest load carries the lining consisting of the ceramic friction material which in operation functions to relieve the load on the brake shoe. However, by providing a layer of organic friction material on the rotating brake part (brake disk) there is provided a considerably larger surface for this material and a substantially lower thermal-mechanical stress is exerted on the organic friction material by the opposing ceramic friction material of the brake shoe. By using a ceramic friction material for the brake shoe, the maximum thermal load which occurs in the ceramic brake shoe lining can be readily withstood, and due to the latter pairing of friction material (organic friction material with respect to the rotating brake part and ceramic friction material for the stationary brake part) the thermal-mechanical load is also better distributed. The service life and efficiency of the brake are improved as a result of a low specific friction surface load which obviously assures long life and low maintenance costs due to reduced friction lining wear. Overall, the latter objectives and a better distribution of the thermal-mechanical load is achieved by the brake of the present invention than has been provided heretofore.

In further accordance with this invention, the piston of the conventional piston/cylinder brake cylinder which urges the brake shoes into forceful engagement with the brake drums or brake disks is also made of ceramic friction material, and the brake cylinder may likewise be similarly constructed from ceramic friction material. The latter reduces heat transmission and by constructing the piston from ceramic friction material the expense of surface treatment associated with a metallic piston is limited.

In accordance with the present invention the brake shoe is therefore no longer the primary object of wear, as in conventional brakes, and therefore the brake shoe can be ideally adapted in size and shape to the diameter of the brake cylinder piston to achieve ideal braking force/pressure.

Finally, in order to avoid shear forces acting upon the ceramic friction layer of the stationary brake part, the edges thereof in opposing intimate relationship to the organic friction layer of the rotating brake part are rounded or chamfered.

With the above, and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
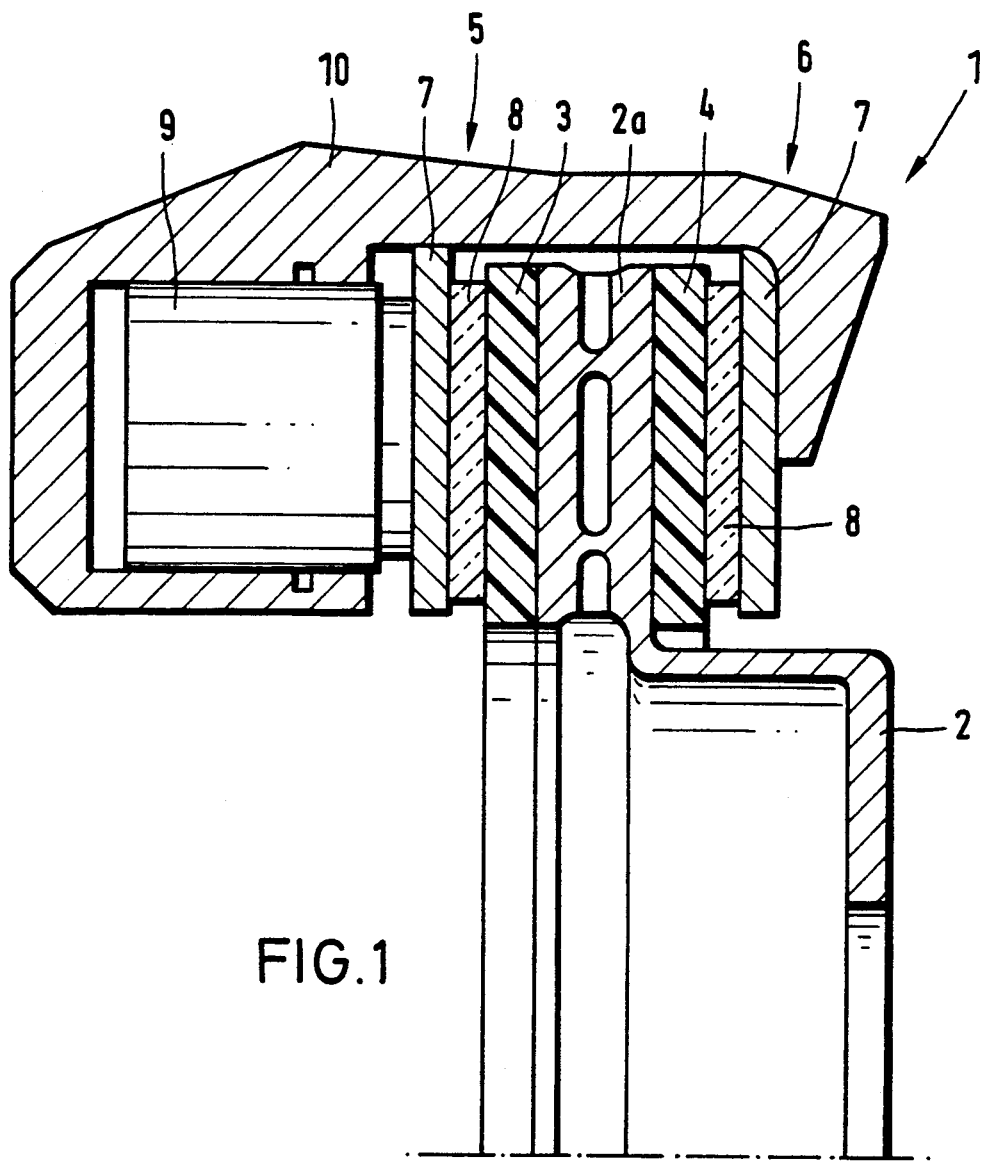
FIG. 1 is a fragmentary axial sectional view taken through a brake of the present invention, and illustrates a brake disk having a periphery carrying organic friction material in opposed relationship to ceramic friction material carried by brake shoes.

Reference is first made to FIG. 1 of the drawings which illustrates a novel brake 1 constructed in accordance with the present invention which is preferably a partial lining brake including a brake disk 2 having a peripherally outboard ring portion 2a to which is bonded or otherwise secured layers of organic friction material 3, 4.

Brake shoes 5, 6 are each defined by a carrier plate 7 coated with a layer of ceramic friction material 8. Each layer of ceramic friction material 8 opposes one of the layers of organic friction material 3, 4, as is evident from FIG. 1.

Figure 4:
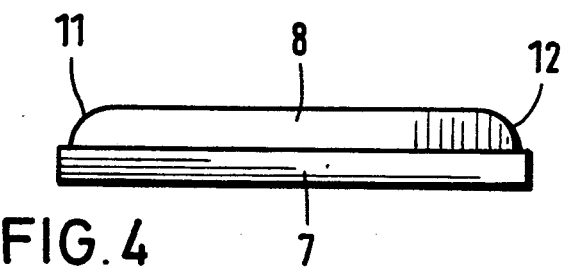
FIG. 4 is an end view of the brake shoes of FIG. 1, and illustrates chamfered edges of the ceramic material friction layer.

A conventional float saddle 10 includes a cylinder (unnumbered) in which is reciprocally mounted a piston 9 which bears against the most adjacent carrier plate 7 to move the latter to the right during the braking operation when hydraulic fluid pressurizes the interior of the cylinder in a conventional manner. Preferably the piston 9 is also constructed from ceramic material, and the cylinder thereof, including the entire floating saddle 10 may also be constructed from ceramic friction material. Edges or edge portions 11, 12 (FIG. 4) of the ceramic friction material layer or coating 8 are also rounded or chamfered to avoid the adverse effect of shear forces on the very hard ceramic material.

Figure 2:
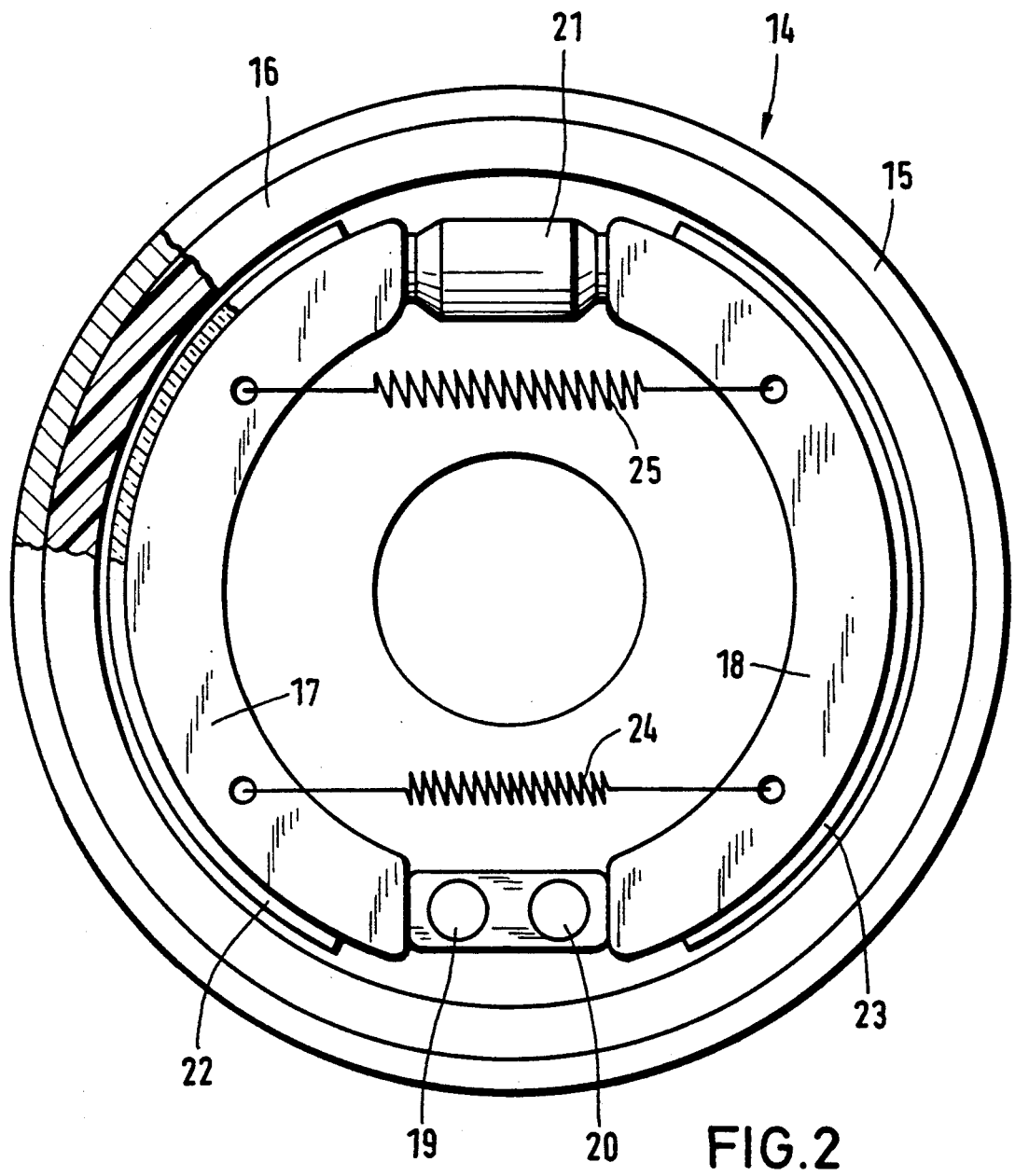
FIG. 2 is a schematic side elevational view with a portion thereof broken away and shown in section for clarity of another brake of the present invention, and illustrates a rotatable brake drum carrying organic friction material and brake shoes each carrying ceramic friction material.

The present invention is also applicable to drum brakes, as is best illustrated in FIG. 2 of the drawings which illustrates a drum brake 14 which includes a drum body 15 having a layer 16 of organic friction material bonded or otherwise secured thereto in a ring-like configuration. Brake shoes 17, 18 are relatively stationary but are mounted for pivotal movement at 19, 20 in a conventional manner, and each carries a layer or coating 22, 23 of ceramic friction material which is brought into forceful engagement with the layer of organic material 16 as a pair of pistons (not shown) of a conventional brake cylinder 21 are moved away from each other to pivot the brake shoes 17, 18 about the pivots 19, 20 counterclockwise and clockwise, respectively, during a braking operation. When hydraulic brake pressure is released in the brake cylinder 21, springs 24, 25 return the brake shoes 17, 18 to the position illustrated in FIG. 2.

Figure 3:
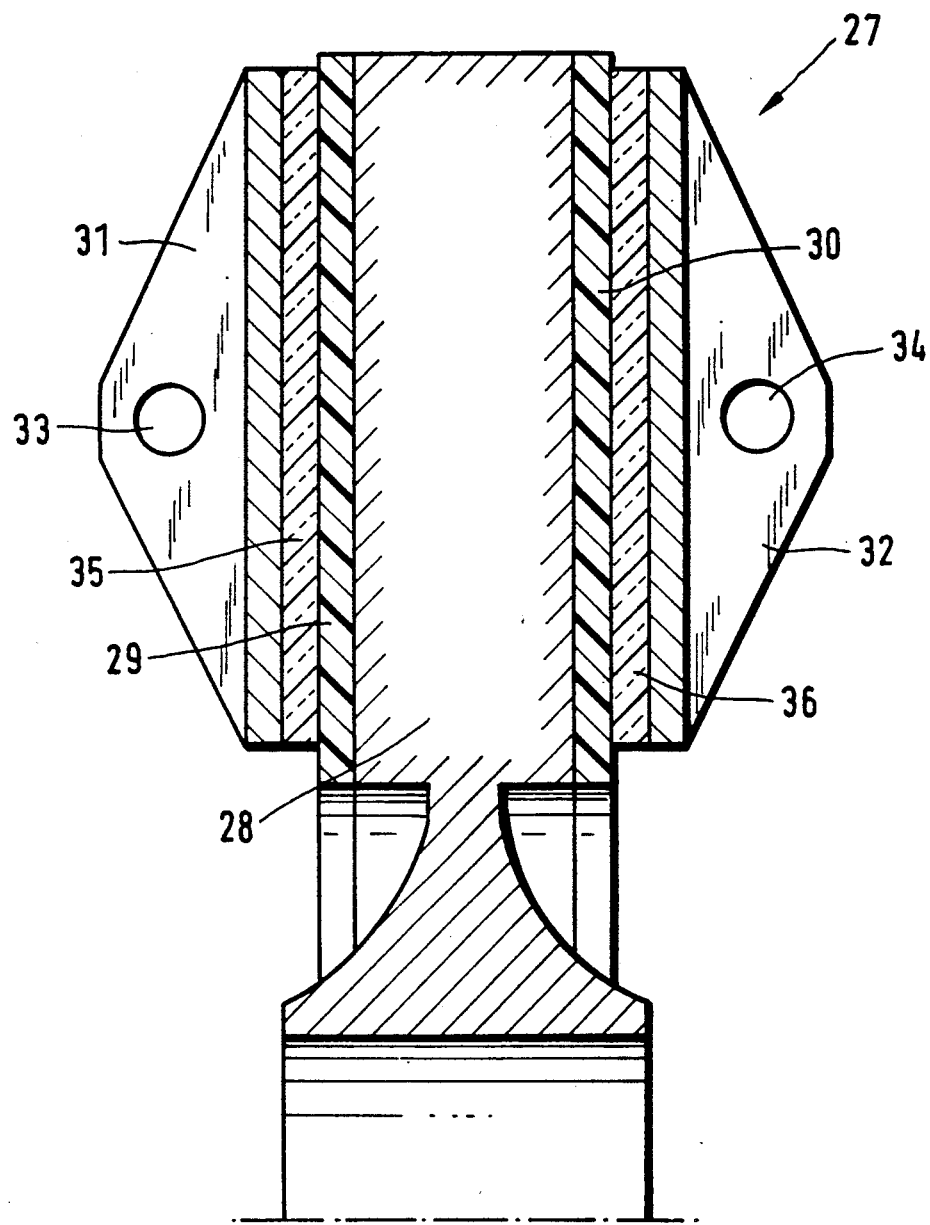
FIG. 3 is an axial sectional view through a railroad vehicle brake of the present invention, and illustrates a disk body carrying organic friction material on opposite faces in opposed relationship to ceramic friction material carried by brake shoes.

Reference is now made to FIG. 3 of the drawings in which a brake 27 is illustrated which is particularly designed for utilization with rail vehicle wheels and includes a disk body 28 provided at both sides with a layer or coating 29, 30 of organic friction material. Brake shoes 31, 32 are also relatively stationary, as compared to the rotatable nature of the disk body 28, and pivoted in a limited fashion about respective pivots or axes 33, 34. The brake shoes 31, 32 carry respective layers or linings 35, 36 of ceramic friction material. Obviously, as in the earlier examples, the surface covered by the organic friction material 29, 30 is substantially larger in area than the area of the ceramic friction linings or layers 29, 36.

The ceramic friction material and the organic friction material used in keeping with this invention may be any suitable conventional ceramic industrial material and any organic brake friction lining material.

Although a preferred embodiment of the invention has been specifically illustrated and described herein, it is to be understood that minor variations may be made in the apparatus without departing from the spirit and scope of the invention as defined in the appended claims.

Examples for the composition of the components of the friction material are listed hereunder as follows:

Organic friction material:
metals (bronze, copper, steel and/or iron): about 54%
binders (phenolic resins): about 8%
fillers (iron oxide, graphite, corundum, reinforcing fibers, rubber and/or sulphur): about 38%

Ceramic friction material:
circonium oxide: $ZrO_2$
silicon carbide: SiC
oxide ceramics

I claim:

1. A brake for vehicle wheels comprising a generally stationary brake part and a rotatable brake part adapted for cooperative braking interaction, said generally stationary brake part and rotatable brake part each respectively carry a layer of friction material, said generally stationary and rotatable brake parts being positioned with the friction material layers in opposing relationship to each other, means for forcefully moving said generally stationary brake part toward said rotatable brake part to effect braking therebetween through frictional contact of said friction material layers, said rotatable brake part friction material layer being plastic-bonded organic friction material, and said generally stationary brake part friction material layer being ceramic friction material.

2. The brake as defined in claim 1 wherein said moving means includes a fluid cylinder and a ceramic piston.

3. The brake as defined in claim 1 wherein said moving means includes a fluid cylinder and a ceramic piston, and said ceramic piston and ceramic friction material layer each have at least one generally similar surface dimension.

4. The brake as defined in claim 1 wherein said generally stationary brake part layer has opposite spaced edges each of which is chamfered.

5. The brake as defined in claim 1 wherein said generally stationary brake part layer is of an arcuate configuration including inner and outer spaced peripheral edges of respective smaller and larger relative radii, and said peripheral edges are each chamfered.

6. The brake as defined in claim 1 wherein said rotatable brake part layer is of a ring-like configuration, said generally stationary brake part layer is of a concavo-convex configuration, and said ring-like rotatable brake part layer includes a generally cylindrical surface disposed in opposing relationship to a convex surface of said concavo-convex generally stationary brake part layer.

7. The brake as defined in claim 1 wherein said rotatable brake part layer is of a ring-like configuration, said generally stationary brake part layer is of a concavo-convex configuration, said ring-like rotatable brake part layer includes a generally cylindrical surface disposed in opposing relationship to a convex surface of said concavo-convex generally stationary brake part layer, and said convex surface merges with opposite chamfered edges of said generally stationary brake part layer.

* * * * *